(12) United States Patent
Shiota et al.

(10) Patent No.: US 6,423,236 B1
(45) Date of Patent: Jul. 23, 2002

(54) METHOD FOR TREATING WASTE WATER

(75) Inventors: Yusuke Shiota, Himeji; Junichi Miyake, Akashi, both of (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/479,069

(22) Filed: Jan. 7, 2000

(30) Foreign Application Priority Data

Jan. 7, 1999 (JP) ............................................. 11-002312

(51) Int. Cl.$^7$ .................................................. C02F 1/72

(52) U.S. Cl. ........................ 210/761; 210/762; 210/765; 210/790; 210/805; 210/321.6; 210/500.38; 210/903; 210/908

(58) Field of Search ................................. 210/758, 761, 210/762, 765, 790, 805, 321.6, 500.21, 500.38, 903, 908

(56) References Cited

U.S. PATENT DOCUMENTS

| 4,699,720 A | 10/1987 | Harada et al. |
| 5,057,220 A | 10/1991 | Harada et al. |
| 5,284,589 A | 2/1994 | Tegtmeyer et al. |

FOREIGN PATENT DOCUMENTS

| JP | 1-262993 | 10/1989 |
| WO | WO 98/41478 | 9/1998 |

OTHER PUBLICATIONS

Patent Abstracts of Japan, vol. 005, No. 049 (C–049), Apr. 8, 1981, JP 56002825, Jan. 13, 1981.
Derwent Publications, AN 1974–86565V, XP002133372, NL 73 07 294, Nov. 26, 1974.
Nitto Denko, KK., 1 page, List of Product for Food and for Process Purpose Application (Thermoplus Series), Dec. 1996 (with partial English Translation).
Nitto Denko, KK., 1 page, "List of Product for Water Re–Use (Seawater Desalting, Demineralization of Brackish Water Etc.), Waste Water, and Other General Purpose Application," Dec. 1996 (with partial English Translation).
Water Re–use Promotion Center, pp. 1–85, "The Development of Waste Water Recycling Technique by Wet–Oxidation Using a Catalyst," Mar. 1989 (with Partial English Translation).
Water Re–use Promotion Center, pp. 1–89, "The Development of Waste Water Recycling Technique by Wet–Oxidation Using a Catalyst," Mar. 1990 (with partial English Translation).

Primary Examiner—Betsey Morrison Hoey
(74) Attorney, Agent, or Firm—Oblon, Spivak, McClelland, Maier & Neustadt, P.C.

(57) ABSTRACT

The present invention relates to a method for treating waste water including the steps of: oxidizing the waste water, and then treating the oxidized waste water with a reverse osmosis membrane having high salt rejection rate. By being treated with the reverse osmosis membrane, the waste water is separated into a impermeated liquid which contains a oxidizable substance, and a permeated liquid which contains almost no oxidizable substance.

36 Claims, 5 Drawing Sheets

METHOD FOR TREATING WASTE WATER

BACKGROUND OF THE INVENTION

1. Field of the Invention

The present invention relates to a method for treating a waste water by employing oxidation to purify it. To be more specific, it relates to a method for treating waste water containing an organic compound having two or more carbon atoms and/or a nitrogen compound by oxidation where the waste water is subjected to oxidation and/or decomposition, and then treating the resultant liquid with a reverse osmosis membrane having high salt rejection rate where the liquid is separated into a liquid which contains a substance to be oxidized (herein after may be referred to as 'oxidizable substance') such as an organic substance and does not permeate through the reverse osmosis membrane, and a liquid which contains almost no oxidizable substance and permeates through the reverse osmosis membrane.

2. Description of the Related Art

As one of methods for treating waste water, oxidation has conventionally been suggested. However, the oxidation is not capable of sufficiently oxidizing and decomposing organic substance and nitrogen compound if they are hard-to-decompose. In the wet-oxidation, organic substances and nitrogen compounds in the waste water is oxidized and/or decomposed. In an attempt to achieve more excellent purification of waste water, the following processes have therefore been attempted: the waste water is subjected to wet-oxidation and the resultant liquid is concentrated by being treated with a reverse osmosis membrane, and then, the concentrated liquid is subjected to wet-oxidation again. For example, Japanese Unexamined Patent Publication No. 1-262993 suggests such a method. Specifically, in this prior art method, the waste water is subjected to wet-oxidation in a reaction tower to suppress the generation of Nox-N, and the resultant liquid is treated with a reverse osmosis membrane to be separated into a liquid which does not permeate through the membrane and a liquid which permeates through the membrane. In the liquid which does not permeate through the membrane, the acid component is concentrated. The liquid containing the concentrated acid components (i.e. the liquid which does not permeate through the reverse osmosis membrane) is mixed with the waste water again so that the pH of the waste water is adjusted to 7, and the mixture is oxidized. By use of the reverse osmosis membrane, the acid components having pH of 1 to 3 are satisfactorily concentrated and remain in the liquid which does not permeate through the membrane; however, it has no ability of eliminating the acetic acid, and almost all the amount thereof passes through the reverse osmosis membrane. As a result, the liquid which permeates through the reverse osmosis membrane contains a oxidizable substance such as acetic acid, and waste water is not purified to a sufficient level.

The article titled "the development of waste water recycling technique by wet-oxidation using a catalyst" ("Distilling technique", Vol. 16, No. 3, page 13 to 24, 1990) describes a method in which waste water is subjected to wet-oxidation, and then processed with a reverse osmosis membrane of polyether type or polyvinyl alcohol type. The reverse osmosis membranes of polyethylene type such as polyethylene oxide type and polyethylene imine type, cellulose acetate type, polyvinyl alcohol type, and polyethel type have high ability of extracting (i.e. removing) acid components having a molecular weight of 100 or larger; however, they exhibit poor ability of eliminating acid components having a molecular weight of less than 100. It is impossible to sufficiently eliminate organic acids such as acetic acid having low molecular weight. In order to eliminate acetic acid, it is necessary to subject the liquid which permeates through the reverse osmosis membrane to another purification step such as methane fermentation.

The present invention has been accomplished to solve the above problems. Accordingly, it is an object of the invention to provide a method for treating waste water in which the waste water is subjected to oxidation, and the resultant liquid is treated with a reverse osmosis membrane to be further separated into a liquid containing a oxidizable substance such as organic substance, and a liquid containing almost no oxidizable substance.

SUMMARY OF THE INVENTION

The present invention provides a method for treating a waste water, comprising the steps of: oxidizing a waste water containing an organic compound having two or more carbon atoms and/or a nitrogen compound; separating the oxidized waste water into a permeated liquid having almost no oxidizable substance and an impermeated liquid having oxidizable substance such as organic acid and/or ammonia through a reverse osmosis membrane having high salt rejection rate.

Also, the present invention provides a method for treating the waste water, comprising the step of: separating the waste water into a permeated liquid and an impermeated liquid through the reverse osmosis membrane having high salt rejection rate; oxidizing all or a part of the impermeated liquid.

Further more, the present invention provides a method for treating the waste water, comprising the steps of: adjusting pH of the waste water to pH 4 or more; and treating the waste water through the reverse osmosis membrane having high salt rejection rate.

DETAILED DESCRIPTION OF THE PREFERRED EMBODIMENTS OF THE INVENTION

Figure 1:
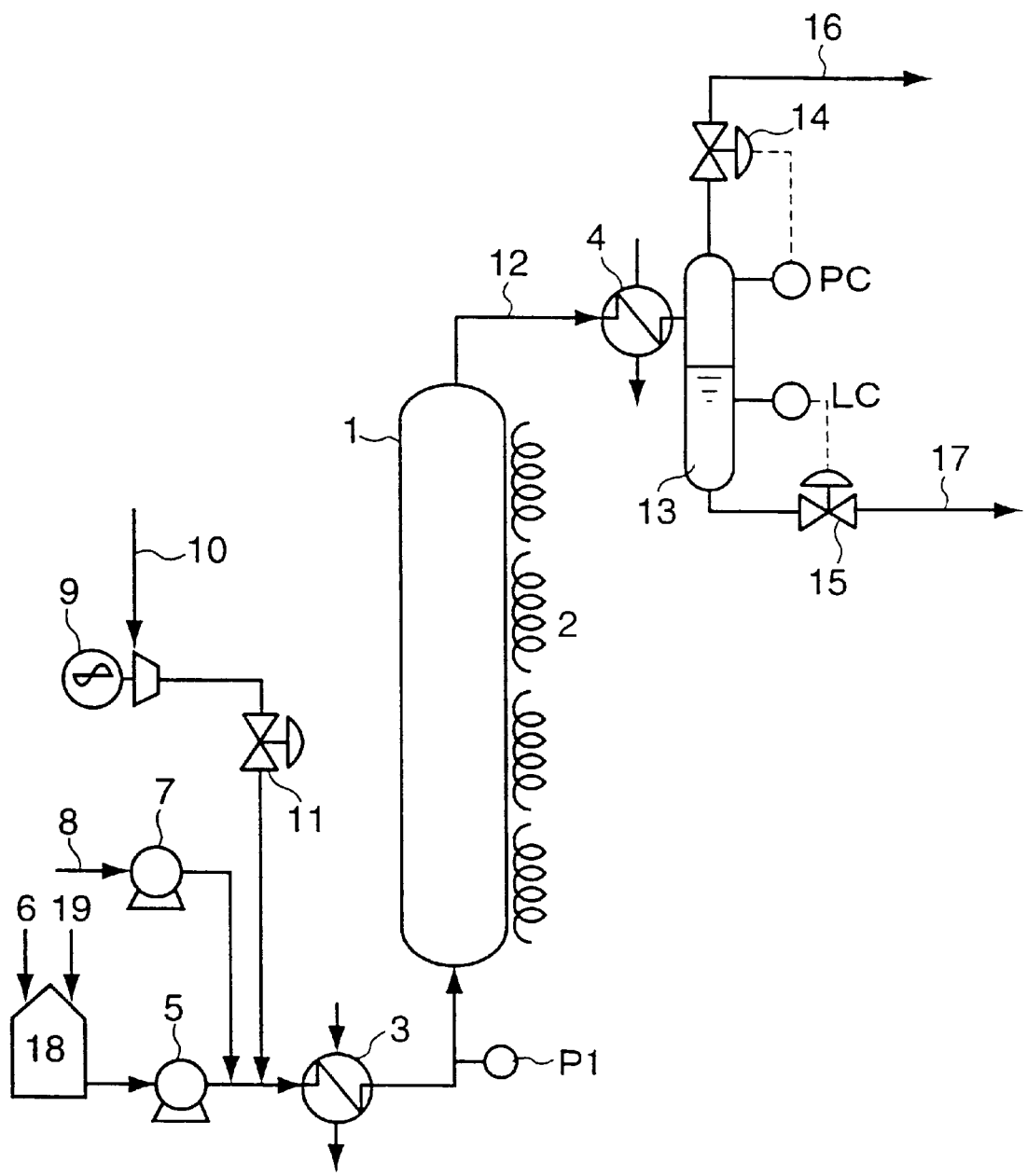
FIG. 1 is a schematic diagram of a wet-oxidation to be used in the embodiment of present invention.

As a result of various studies, the present inventors have found a method for highly purifying a waste water. In the liquid obtained by oxidation and/or decomposition (herein after may be referred to as "oxidation"), oxidizable substances such as an organic acid (such as acetic acid) and/or a ammonia is contained. And then the liquid is treated with a reverse osmosis membrane having high salt rejection rate to be separated into a liquid which impermeates the membrane (hereinafter, may be referred to as "impermeated liquid") and a liquid which permeates the membrane (hereinafter, may be referred to as "permeated liquid"). In the impermeated liquid, the oxidizable substance is concentrated and left, while in the permeated liquid, almost no oxidizable substance is left. As a result, the permeated liquid is a highly purified. Also the present inventors have found a method for improving the efficiency of oxidation of the waste water. In the impermeated liquid obtained by processing the waste water with a reverse osmosis membrane, oxidizable substances is concentrated. And then the impermeated liquid treated with oxidation.

Further more, the present inventors have found a method for improving separation performance of the reverse osmosis membrane by adjusting the pH of the waste water to 4 or more.

The method for purifying a waste water of the present invention includes the steps of: oxidizing a waste water containing an organic compound having two or more carbon atoms and/or a nitrogen compound; waste water is subjected to oxidation; and treating the oxidized waste water (hereinafter, referred to as "a wet-oxidized liquid") with a reverse osmosis membrane having high salt rejection rate where the wet-oxidized liquid is separated into the impermeable liquid having not permeated through the reverse osmosis membrane and the permeated liquid having permeated through the reverse osmosis membrane. In the impermeated liquid, the organic acid and/or ammonia is concentrated and left; thereby obtaining highly-purified permeated liquid with almost no organic acid and/or ammonia.

As the waste water to be used in the oxidation according to the present invention, any waste water that contains an organic compound having two or more carbon atoms and/or a nitrogen compound, and for example, waste water discharged from various industrial plants such as chemical plants, electronic parts manufacturing plants, food processing plants, metal processing plants, plating plants, printing plate making plants, and photographic processing plants, and also may be waste water discharged from electric power plants such as heat power plants and atomic power plants can be used. To be more specific, waste water discharged from electrooculography (EOG) manufacturing plants and alcohol production plants such as methanol, ethanol, and higher alcohol is recommended. Especially, waste water containing organic substance discharged from production plants of aliphatic carboxylic acids such as acrylic acid, acrylic ester, methacrylic acid, methacrylic ester or esters thereof, aromatic carboxylic acids such as terephthalic acid and terephthalic ester, and aromatic carboxylic acid esters. It also may be waste water containing nitrogen compounds such as amine, imine, ammonia and hydrazine, for example, domestic waste water such as sewage and excrements can be used. In addition, it may be waste water containing harmful matter such as organic halogenated compounds and environmental hormones including dioxins, freons, diethyl hexyl phthalate, and nonyl phenol.

The present invention will be further illustrated with reference to FIG. 1, which is a schematic diagram of wet-oxidation to be used in the embodiment of the present invention. It should be noted that the apparatus of FIG. 1 is just an example of an apparatus usable in the method of the present invention, and the present invention does not necessarily use this apparatus.

Waste water containing an organic compound having two or more carbon atoms, /or a nitrogen compound is supplied from a said waste water supply source, and is supplied through a waste water line 6 to a waste water tank 18 where the waste water may be mixed with a liquid which does not permeate through a reverse osmosis membrane described later. The impermeated liquid may be supplied to the waste water at any point, and the waste water tank 18 may be omitted.

The waste water may be treated with a reverse osmosis membrane before being subjected to the oxidation. The waste water is separated into the permeated liquid and the impermeated liquid in which organic compound having two or more carbon atoms and/or nitrogen compound is concentrated. As the reverse osmosis membrane, those used for treating the oxidized liquid (described later) can also be used in the present method. And also, the separation performance of the reverse osmosis membrane can be improved by adjusting pH of the waste water to pH 4 or more. Further more, oxidizing thus obtained impermeated liquid can improves the efficiency of oxidation. By employing this method to wet-oxidation, minimization of a wet-oxidation unit and thermal self-supporting operation can be attained and which contribute to the cost reduction. Even though this method gives such advantages to wet-oxidation, the minimization of the unit and thermal self-supporting operation can not be attained when applying this method to the demonstration plant.

All or a part of the impermeated liquid can also be subjected to a collection process (described later).

The waste water is supplied from the waste water tank 18 to a heater 3 by a waste water supply pump 5. The space velocity at this time is not specifically limited, and is properly determined in accordance with the processing capacity of the reaction tower. The space velocity at the reaction tower is preferably fall in the range from 0.1 $hr^{-1}$ to 10 $hr^{-1}$, and more preferably from 0.2 $hr^{-1}$ to 5 $hr^{-1}$, and the most preferably from 0.3 $hr^{-1}$ to 3 $hr^{-1}$. If the space velocity is lower than 0.1 $hr^{-1}$, the efficiency of treating waste water in the reaction tower 1 may be lowered, and large equipment may be needed. Contrary to this, if the space velocity is higher than 10 $hr^{-1}$, the oxidation of the waste water cannot be sufficiently conducted in the reaction tower 1.

In the method of the present invention, the waste water can be treated in the presence or absence of a gas containing oxygen. Preferably, the waste water is treated in the presence of a gas containing oxygen. By increasing the oxygen concentration of the waste water, the oxidizable substance in the waste water can be oxidized and decomposed with high efficiency.

When the waste water is treated in the presence of an oxygen-containing gas, the gas is introduced through an oxygen-containing gas supply line 10 before the waste water is supplied to the heater 3. After the pressure of the gas is raised by a compressor 9, the gas is mixed with the waste water.

The oxygen-containing gas to be used in the present invention include any gas as far as it contains oxygen molecules and/or ozone. As examples such a gas include, but not limited to, pure oxygen, an oxygen enriched gas, air and an exhaust gas containing oxygen from other plants and aqueous solutions of hydrogen peroxide. Among them, the air is cheap and is recommended.

The supply amount of the oxygen-containing gas is not specifically limited, and the gas may be supplied in an amount effective in increasing the efficiency of oxidizing/decomposing the oxidizable substance in the waste water. The supply amount of the oxygen-containing gas can be adjusted, for example, by mounting an oxygen-containing gas flow rate control valve 11. The amount of oxygen in the oxygen-containing gas preferably fall in the range from 0.5 to 5.0 times, and more preferably from 0.7 to 3.0 times relative to the theoretical amount of oxygen required for oxidizing and decomposing the oxidizable substance in the waste water. If the amount of the oxygen is less than 0.5 times, the oxidizable substance in the waste water is not sufficiently oxidized/decomposed, and remains in a relatively large amount in the wet-oxidized liquid. When such a wet-oxidized liquid is treated with the reverse osmosis membrane in the next step, the reverse osmosis membrane has to overwork. Contrary to this, if the amount of the oxygen is larger than 0.5 times, the effect of oxidizing/decomposing the oxidizable substance is saturated.

The term "the theoretical amount of oxygen required for oxidizing and oxidizing/decomposing the oxidizable substance in the waste water" means an amount of oxygen required for decomposing the oxidizable substance into ash content, nitrogen, carbon dioxide, and sulfate.

"The theoretical amount of oxygen required for oxidizing and decomposing the oxidizable substance in the waste water" can also be represented by chemically oxidizing amount (COD(Cr)).

The waste water is heated by the heater 3, and is supplied to the reaction tower 1. Depending on the other conditions, the temperature of the waste water in the reaction tower 1 should preferably be conducted at 270° C. or lower, and more preferably 230° C. or lower, and the most preferably 170° C. or lower. If the temperature of the waste water is higher than 370° C., high pressure is needed to the waste water in order to keep it in a liquid phase. In this case, large-sized equipment and high running cost are required. On the contrary, the lower limit of the temperature of the waste water in the reaction tower 1 should preferably be 100° C., and more preferably 110° C. If the temperature of the waste water is lower than 80° C., it is difficult to efficiently oxide and decompose the oxidizable substance in the waste water.

The waste water may be heated at any position and pre-heated by heater 3, before supplying to the reaction tower 1. As is the case above, the waste water may be heated by the heater 3, and is supplied to the reaction tower 1. Alternatively, the waste water may be heated in the reaction tower 1, or a heat source such as steam may be supplied to the waste water.

Depending on the other conditions, the pressure in the reaction tower 1 is not specifically limited insofar as the waste water keeps its liquid phase. In general, if the temperature of the waste water in the reaction tower 1 is higher than 80° C., and lower than 95° C., it is preferable to apply suitable pressure to the waste water for improving the efficiency of the wet-oxidation, or can be conducted under atmospheric pressure. If it is higher than 95° C., the waste water may turns into gas phase under atmospheric pressure and applying the enough pressure to the waste water is needed to keep its liquid phase.

If the temperature of the waste water in the reaction tower 1 is higher than 95° C., and lower than 170° C., it is preferable to apply pressure about 0.2–1 MPa(Gauge) to keep its liquid phase. If it is 170° C. or higher, and lower than 230° C., it is preferable to apply pressure about 1–5 MPa(Gauge) to keep its liquid phase. Further more, if it is 230° C. or higher, it is preferable to apply pressures above 5 MPa(Gauge) to keep its liquid phase.

In the wet-oxidation in the method of the present invention, the number, kind, and shape of the reaction tower 1 are not specifically limited, and one or more reaction towers which have been conventionally used in wet-oxidation may be employed. For example, a reaction tower may be in the form of single-tube or multiple-tube. When a plurality of reaction towers are used, they are arranged at any positions, for example, lengthwise or in parallel with each other in accordance with the necessity.

When the waste water is supplied to the reaction tower 1, its flow may be in any direction: for example, the waste water is supplied to the reaction tower 1 together with the oxygen-containing gas so that the waste water and the oxygen-containing gas flow in the reaction tower 1 in an upward direction; in a downward direction; and in opposite directions to each other. Alternatively, two or more of these supply methods may be employed in combination.

Preferably, a solid catalyst is charged in the reaction tower 1. When the solid catalyst is used, organic compound and nitrogen compound in the waste water are oxidized and decomposed with higher efficiency, and the temperature inside the reaction tower 1 is kept higher than the case of using no catalyst. The kind of solid catalyst is not specifically limited, and recommended is a solid catalyst containing at least one metal selected from the group consisting of manganese, cobalt, nickel, copper, cerium, silver, platinum, palladium, rhodium, gold, iridium, and ruthenium. The content of the metal is not specifically limited, and preferably, from 0.01 to 25 weight percent and more preferably, 0.05 to 10 weight percent of the metal is contained in the solid catalyst. It is more preferable that the solid catalyst also contains, in addition to the above elements, at least one metal selected from the group consisting of titanium, zirconium, aluminum, silicon, iron, and activated charcoal.

The shape of the solid catalyst is not specifically limited, and may be any shape. For example, the solid catalyst may be in the shape of pellet, sphere, grain, ring, or honeycomb.

And also, the application of the solid catalyst to be used in the present invention is not specifically limited. For example, a plural kinds of solid catalysts may be used together. When a plurality of reaction towers are used, it is possible to use a reaction tower with the solid catalyst and a reaction tower without the solid catalyst in combination.

On top of the solid catalyst, the reaction tower 1 may be provided with various fillers and internal products in order to sufficiently stir the waste water and the oxygen-containing gas, to sufficiently bring them into contact with each other, and to suppress the drift thereof.

If the temperature of the waste water becomes too high in the reaction tower 1, the waste water turns into gas, and in this state, organic substance and inorganic substance attach onto the surface of the solid catalyst, and the activity thereof is impaired. In order that the waste water keeps its liquid phase even under at a high temperature, it is recommended to give pressure inside the reaction tower 1. It is also desirable to provide a pressure control valve to the reaction tower 1 on its gas outlet side. By the pressure control valve, the reaction pressure can be controlled in accordance with the temperature of the waste water inside the reaction tower 1 so that it can keeps its liquid phase.

The oxidizable substance in the waste water is oxidized and decomposed in the reaction tower 1. The term "oxidation" mean various treatments. For example, when the oxidizable substance is an easy-to-decompose substance, it is decomposed into ash content, nitrogen gas, carbon dioxide, and water. Specific examples thereof include oxidation where acetic acid is decomposed into carbon dioxide and water, decarboxylation where acetic acid is decomposed into carbon dioxide and methane, hydrolysis where urea is decomposed into ammonia and carbon dioxide, and oxidative destruction where ammonia and hydrazine are decomposed into nitrogen gas and water, oxidation and/or decomposition of dimethyl sulfoxide into carbon dioxide, water and ash content such as sulphate ion, oxidation of dimethyl sulfoxide into dimethyl sulfone and methane sulfonic acid. When the oxidizable substance is a hard-to-decompose organic substance or nitrogen compound, it is decomposed to have low molecular weight.

In the wet-oxidation of the waste water, the hard-to-decompose organic substance is decomposed to have low molecular weight, and remains in the wet-oxidized liquid in many cases. The low molecular weight organic substance is usually organic acid, and specifically, organic acid is acetic acid in many cases. When the oxidizable substance in the waste water is nitrogen compound, it is decomposed into ammonia in the wet-oxidation, and remains in the wet-oxidized liquid in many cases.

After the waste water is oxidized and decomposed in the reaction tower 1, the resultant wet-oxidized liquid is discharged through a wet-oxidized liquid line 12, and if necessary, to a cooler 4 where it is cooled to a proper temperature. Then, the wet-oxidized liquid is supplied to a gas-liquid separator 13 where it is separated into a gas and a liquid. In the gas-liquid separator 13, it is preferable that the surface level of the wet-oxidized liquid is detected by a liquid level controller LC, and is controlled to be constant by a surface level control valve 15. Alternatively, the wet-oxidized liquid may be cooled or not be cooled to a proper temperature by the cooler 34 shown in FIG. 3, and is discharged through a pressure control valve 44(FIG. 3) to the gas-liquid separator 43 where it is separated into a gas and a liquid.

The temperature inside the gas-liquid separator 13 is not specifically limited. Since the wet-oxidized liquid obtained by the oxidation of the waste water in the reaction tower 1 contains carbon dioxide, it is preferable that the temperature inside the gas-liquid separator 13 is kept to be high so that the carbon dioxide is released from the wet-oxidized liquid. It is also preferable that the liquid obtained by the separation in the gas-liquid separator 13 is subjected to bubbling using a gas such as the air so that the carbon dioxide is released therefrom.

The liquid obtained by the separation in the gas-liquid separator 13 (i.e. the wet-oxidized liquid from which the gas is released) is treated with a reverse osmosis membrane having high salt rejection rate. By the reverse osmosis membrane, the liquid is separated into the impermeated liquid containing the oxidizable substance, and the permeated liquid containing almost no oxidizable substance. When the wet-oxidized liquid is supplied to the reverse osmosis membrane, the temperature of the liquid is preferably 40° C. or lower in order to keep the durability of the membrane. The temperature of the wet-oxidized liquid after the gas-liquid separation is preferably kept at 40° C. or lower by a heat exchanger (not shown) or a cooler (not shown). The wet-oxidation to be used in the present inventive method, the heater and the cooler may be replaced by the heat exchanger or can be used in combination.

Before being treated with the reverse osmosis membrane, the wet-oxidized liquid may be subjected to a solid-liquid separation using various filtering apparatuses such as medium frequency (MF) membrane and ultrafiltration (UF) membrane.

As described above, the wet-oxidized liquid is treated with the reverse osmosis membrane having high salt rejection rate. The organic acid (such as acetic acid) and/or nitrogen compound (such as ammonia) in the wet-oxidized liquid is captured and concentrated into the impermeated liquid.

Purification of waste water with higher efficiency can be attained when the oxidizable substance in the wet-oxidized liquid is mainly organic acid and/or nitrogen compound. Preferably, 30 weight percent or more, and more preferably 50 weight percent or more, and the most preferably 70 weight percent or more of the oxidizable substance in the wet-oxidized liquid should be organic acid and/or ammonia.

The amount of the oxidizable substance in the waste water can be calculated from a value obtained by measuring the total oxygen demand (TOD), theoritical oxygen demand (ThOD), chemical oxygen demand (COD(Cr)), chemical oxygen demand (COD(Mn)), total organic carbon (TOC), biochemical oxygen demand (BOD), total nitrogen, or a specific component.

The term "the reverse osmosis membrane having high salt rejection rate" means a reverse osmosis membrane which preferably has 98.0 percent or higher, more preferably 99.0 percent or higher, and the most preferably 99.5 percent of salt rejection (rejection rate) with respect to 0.15 percent aqueous solution of sodium chloride (NaCl) at a pressure of 1.47 Mpa(Gauge), pH of 6.5, and a temperature of 25° C., and also exhibits high separation performance (rejection rate of 60 percent or higher, and preferably 70 percent or higher, and more preferably 80 percent or higher) with respect to organic acid having a molecular weight of less than 100, for example, acetic acid. As such a reverse osmosis membrane, there are reverse osmosis membranes of polyamide type such as crosslinked polyamide type and aromatic polyamide type, aliphatic amine type, heterocyclic polymer type, and the like. Among them, preferable are those of polyamide type such as crosslinked polyamide type and aromatic polyamide type, because they exhibit high separation performance for organic acid and/or ammonia.

Contrary to the above, it is not preferable to use reverse osmosis membranes which exhibit poor separation performance (i.e. rejection rate of less than 60 percent) for organic acid having a molecular weight of less than 100, for example acetic acid, even if they have high salt rejection rate. Examples of undesirable reverse osmosis membranes include those of cellulose acetate type, polyethylene type, polyvinyl alcohol type, and polyether type.

The reverse osmosis membrane is categorized into an asymmetrical membrane and composite membrane in regard to its form, and the composite membrane is especially recommended. In the present invention, a composite reverse osmosis membrane of polyamide type is preferable.

The membrane module of the reverse osmosis membrane used in the present invention is not specifically limited, and may be any module. For example, it may be flat membrane module, hollow yarn module, spiral module, cylindrical module, and pleated module. Among them, spiral module is preferable because it has large membrane area and contribute to a downsizing of the apparatus.

There is no limitation on the amount of the wet-oxidized liquid to be treated with the reverse osmosis membrane, and all or a part of the wet-oxidized liquid may be treated.

In treating the wet-oxidized liquid with the reverse osmosis membrane, excellent separation performance can be expected if the organic acid and/or ammonia in the wet-oxidized liquid are respectively organic acid salt and ammonium salt. As a result of the separation, the impermeated liquid contains large amount of oxidizable substance such as organic acid salt and ammonium salt, whereas the permeated liquid contains almost no oxidizable substance, and therefore, is highly purified.

As a preferable method for changing the organic acid such as acetic acid into the salt thereof, an alkaline metal ion and/or ammonium ion is added in the process of treating the waste water.

When an alkali metal ion and/or ammonium ion is added, it bonds to the organic acid to form organic acid salt. This organic acid salt has molecules large in size, and cannot pass through the reverse osmosis membrane. As a result, the organic acid salt is eliminated more assuredly. In addition, when the organic acid bonds to an alkali metal ion and/or ammonium ion, it gains negative charge. Since the reverse osmosis membrane also charged negatively, electrostatic is generated therebetween, and they refuse each other. As a result, the oxidizable substance does not pass through the reverse osmosis membrane and is eliminated with high efficiency.

The position adding the alkali metal ion and/or ammonium ion is not specifically limited, and it may be added at any point. For example, it may be added to the waste water with an alkali supply line 8 provided to the position shown in FIG. 1, or may be added to the wet-oxidized liquid. The reverse osmosis membrane exhibits higher separation performance when 50 mole percent or more of the alkali ion and/or ammonium ion is added with respect to the total amount of the organic acid in the wet-oxidized liquid.

As a preferable method for changing an ammonia into the salt thereof, an organic acid and/or an inorganic acid is added in the process of treating the waste water. As a preferable additive, inorganic acid such as sulfuric acid is preferably used over organic acid, since adding organic acid may lower the purification of treated waste water.

If the waste water containing nitrogen compound is subjected to wet-oxidation in the presence of organic substance, carbonate is generated in the process of oxidizing and decomposing the nitrogen compound. The carbonate reacts with the ammonia to form ammonium salt.

When the organic acid and/or inorganic acid is added in the process of treating the waste water, it forms ionic bond with the ammonia to form ammonium salt. The ammonium salt has molecules large in size, and therefore, cannot pass through the reverse osmosis. As a result, the ammonium salt is eliminated more assuredly.

As in the case of changing the organic acid into the organic salt, the position to add the organic acid and/or inorganic acid is not specifically limited. The reverse osmosis membrane exhibits more excellent separation performance when 50 mole percent or more of the organic acid and/or inorganic acid is added with respect to the total amount of the alkali component in the wet-oxidized liquid.

When the organic acid and/or ammonia is respectively turned into the organic acid salt and ammonium salt, the pH of the wet-oxidized liquid changes. If the wet-oxidized liquid has pH of 4 or larger at the time when it is treated with the reverse osmosis membrane, more excellent separation performance can be attained, and the oxidizable substance is eliminated more assuredly. As a result, highly purified permeated liquid is obtained.

When the wet-oxidized liquid has high content of organic acid, it is preferable to adjust its pH to 4 or higher, and more preferably 5 or higher, and the most preferably 6 or higher. The upper limit thereof is preferably 9, and more preferably 8, and the most preferably 7.5. If the pH is higher than 9, the separation ability of the reverse osmosis membrane may be impaired in many cases.

When the wet-oxidized liquid has high content of ammonia, it is preferable to adjust its pH to 4 or higher, and more preferably 5, and the most preferably 6. The upper limit thereof is preferably 9, and more preferably 8. If the pH is too high, the separation ability of the reverse osmosis membrane may be impaired.

By employing the method of the present invention, the organic acid (and/or organic acid salt) and/or ammonia (and/or ammonium salt) is captured and concentrated in the impermeated liquid. All or a part of the impermeated liquid may be directly or indirectly returned to the waste water at an arbitrary step of the treatment. For example, it is directly returned to the waste water which is before subjected to the wet-oxidation, or is supplied to the waste water at an arbitrary point of the waste water supply line, and the mixture is subjected to the wet-oxidation.

By circulating the impermeated liquid in the treatment apparatus to repeatedly subject it to the wet-oxidation, the oxidizable substance can be almost completely oxidized and decomposed.

The organic acid (and/or organic acid salt) and/or the ammonia (and/or ammonium salt) may be collected from all or a part of the impermeated liquid. The collection method is not specifically limited, and any known methods may be employed. For example, they are collected by direct distillation, or the organic acid is extracted using organic solvent, and from the extract, water and the organic solvent are removed by distillation to collect the organic acid.

According to the method of the present invention, the reverse osmosis membrane separates the waste water into the impermeated liquid containing oxidizable substance such as organic substance, and the permeated liquid containing no oxidizable substance. The permeated liquid with almost no oxidizable substance is highly purified, and therefore, does not require the treatment of acetic acid such as biological treatment which has been conventionally conducted.

All or a part of the impermeated liquid may be subjected to biological treatment such as methane fermentation, or may be subjected to other water treatments such as combustion. As a result of the separation using the reverse osmosis membrane, the volume of the impermeated liquid is smaller as compared with the wet-oxidized liquid before being treated with the reverse osmosis membrane. In addition, in the impermeated liquid, the oxidizable substance is concentrated. Therefore, the impermeated liquid can be treated with high efficiency at low cost.

When all or a part of the permeated liquid is further treated with the reverse osmosis membrane, highly purified liquid can be obtained. And also, all or a part of the impermeated liquid may be added to the wet-oxidized liquid to be treated with the reverse osmosis membrane or may be added to the waste water to be treated by the wet-oxidation. In accordance with necessity, the treatment with the reverse osmosis membrane may be combined with other treatments such as biological treatment and chemical treatment.

The permeated liquid obtained by the method of the present invention is highly purified, and is reusable as water for industrial use and home use. Alternatively, the permeated liquid may be subjected to further purification treatment to be used as pure water.

A part of the oxidized liquid and/or all or a part of the permeated liquid may be directly returned to the waste water which is before subjected to the oxidation, or may be supplied to the waste water at an arbitrary point of the waste water supply line, and the mixture is subjected to the oxidation. For example, when the waste water is diluted with the oxidized liquid and/or the permeated liquid, the TOD concentration and COD concentration thereof can be lowered. Alternatively, the permeated liquid may be used as dilution water for lowering the salt concentration of the waste water. In addition to wet-oxidation, other oxidation method can be employed as "oxidation" in the present invention, such as supercritical oxidation, ozonation, Biological treatment, thermal treatment and oxidation by hydrogen peroxide, perchlorate, nitrous acid, ultraviolet light or electrolysis.

Hereinafter, the present invention will be further illustrated in detail with reference to several inventive examples and comparative examples below, which are not directed to limiting the scope of the invention.

EXAMPLES

Example 1

Figure 2:
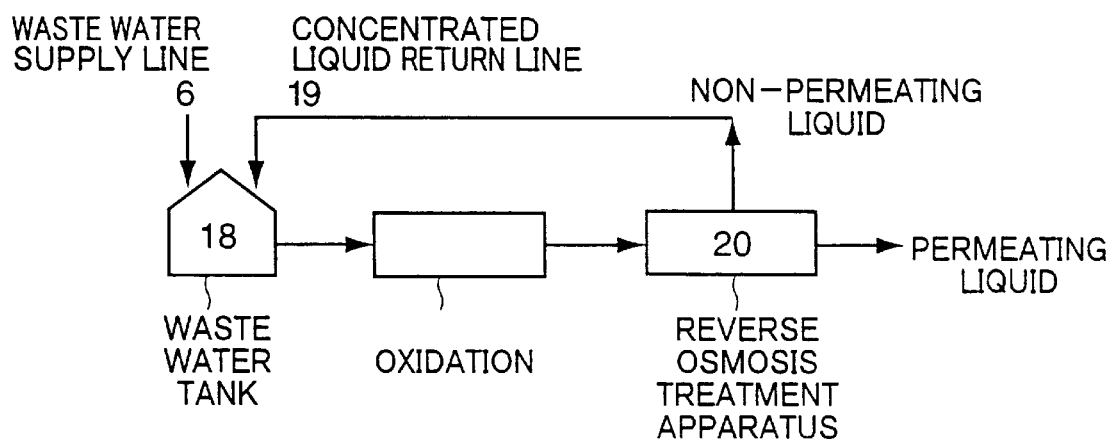
FIG. 2 is a conceptual diagram of the method for treating waste water in the embodiment of the present invention.

FIGS. 1 and 2 are schematic diagram illustrating an method of treating waste water used in the present example. Waste water was treated for 500 hours under the condition described below.

[Wet-oxidation]

A reaction tower 1 used for the wet-oxidation had the shape of cylinder with a diameter of 26 mm and a length of 3000 mm. The reaction tower 1 was filled with 0.8 liters of a catalyst containing titania and platinum as main components, and the content of the platinum was 0.1 weight percent. The waste water to be used in Example 1 was from a plant producing aliphatic carboxylic acid and aliphatic carboxylic acid ester, and contained a large amount of organic compounds having two or more carbon atoms such as alcohol, aldehyde, and carboxylic acid. The waste water had COD (Cr) of 35 g/liter, and pH of 2.8. The waste water contained neither alkali metal ion, ammonium ion, nor inorganic salt.

The above-described waste water supplied through a waste water supply line 6 was mixed with the liquid which did not permeate through the reverse osmosis membrane described later in a waste water tank 18. The resultant waste water was pressurized by a waste water supply pump 5 to flow at a flow rate of 2.4 liter/h, and was heated to 200° C. by a heater 3. Then, the waste water was supplied to the reaction tower 1 from its bottom side. On the other hand, the air was introduced through a oxygen-containing gas supply line 10, and was pressurized by a compressor 9. Then, the flow rate of the air was controlled by an oxygen-containing gas flow rate control valve 11 so that the relationship of $O_2/COD$ (Cr) (i.e. the amount of oxygen in the supplied air/the amount of oxygen which the waste water chemically requires)=1.1 was satisfied. After that, the air was mixed with the waste water at the position before a heater 3. In the reaction 1, the waste water and the air were made to flow in an upward direction in parallel with each other.

In the reaction tower 1, the temperature of the waste water was kept at about 200° C. by an electric heater, and the oxidation thereof was conducted. After the wet-oxidation, the wet-oxidized water was supplied through a wet-oxidized liquid line 12 to a gas-liquid separator 13 where the separation of the liquid and the gas was conducted. In the gas-liquid separator 13, the liquid level was detected by a liquid level controller (LC), and the wet-oxidized liquid was discharged from a liquid level control valve 15 in the state where its liquid level was kept to be constant. The pressure inside the reaction tower 1 was detected by a pressure controller (PC), and was kept to 2.45 Mpa(Gauge) by a pressure control valve 14.

The wet-oxidized liquid obtained in the above wet-oxidation had COD (Cr) of 2.6 g/liter, and pH of 3.0. Among the total TOC components, 92 percent was acetic acid.

[Treatment with Reverse Osmosis Membrane]

The wet-oxidized liquid was supplied to the reverse osmosis treatment apparatus 20 shown in FIG. 2 in the state where its pressure was kept at 4.9 Mpa(Gauge). The wet-oxidized liquid was treated by the reverse osmosis membrane so that the volume of impermeated liquid became about one fifth (⅕) of the wet-oxidized liquid. As the reverse osmosis membrane, a polyamide type composite membrane satisfying the requirements of the present invention (having salt rejection (i.e. rejection rate) of 99.5 percent with respect to 0.15 percent aqueous solution of sodium chloride) was used.

The permeated liquid had COD (Cr) of 1.1 g/liters, and the impermeated liquid had COD (Cr) of 8.4 g/liter. Ninety-five percent of the impermeated liquid was supplied to the waste water tank 18 through a concentrated liquid return line 19 to be mixed with the waste water.

Figure 5:
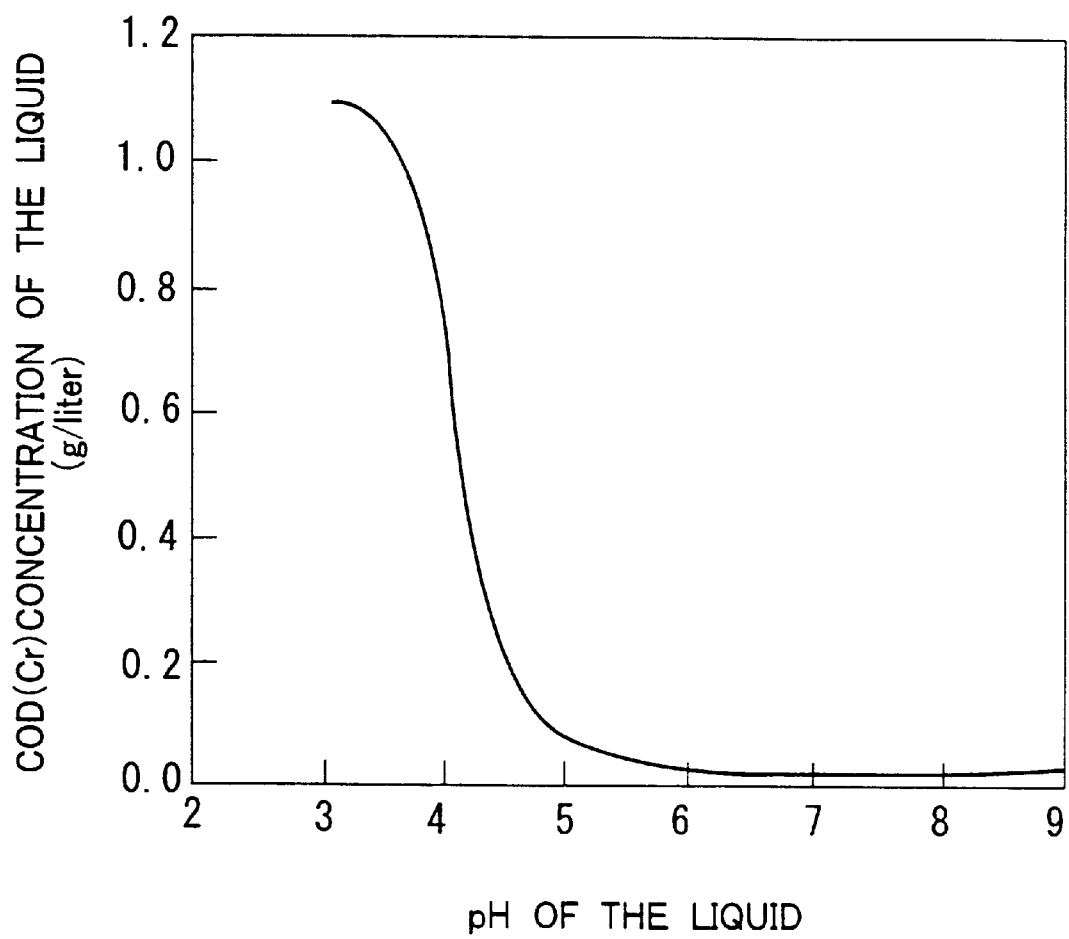
FIG. 5 is a graph showing the relationship between the COD(Cr) concentration of the liquid which permeates through the reverse osmosis membrane and the pH of the liquid obtained by the wet-oxidation in Example 1.

To the wet-oxidized liquid, sodium hydrate was added to change the pH of the wet-oxidized liquid. Then, the wet-oxidized liquid was treated with reverse osmosis membrane. The COD (Cr) concentration of the obtained permeated liquid was examined. The result of the examination is shown in FIG. 5.

Comparative Example 1

[Treatment with Reverse Osmosis Membrane]

The wet-oxidized liquid obtained in Example 1 (having COD (Cr) of 2.6 g/liters) was treated with the reverse osmosis membrane by repeating steps of Example 1, except that an acetic acid cellulose type membrane (having salt rejection (i.e. rejection rate) of 95 percent with respect to 0.15 percent aqueous solution of sodium chloride) was used as the reverse osmosis membrane.

The obtained permeated liquid had COD (Cr) of 2.3 g/liters. The acetic acid cellulose type membrane as the reverse osmosis membrane had no ability of separating organic substances, and no substantial result of separation was obtained.

Example 2

[Wet-oxidation]

Wet-oxidation was conducted by repeating the steps of Example 1, except that a sodium hydrate aqueous solution was supplied through an alkali supply line 8. The supply amount of the sodium hydrate aqueous solution was controlled so that the pH of the wet-oxidized liquid became about 6. The same waste water as that used in Example 1 was used.

The wet-oxidized liquid had COD (Cr) of 3.0 g/liters. Among the total TOC components, 93 percent was acetic acid. The wet-oxidized liquid contained sodium (Na) in an amount about 1.5 mol times larger than the acetic acid.

[Treatment with Reverse Osmosis Membrane]

The wet-oxidized liquid was treated with the same reverse osmosis membrane as that used in Example 1 by repeating the steps of Example 1.

The permeated liquid had COD (Cr) of less than 0.1 g/liter, and the impermeated liquid had COD (Cr) of 15 g/liter. Ninety-five percent of the impermeated liquid was supplied to the waste water tank 18 through a concentrated liquid return line 19 to be mixed with the waste water.

Comparative Example 2

[Treatment with Reverse Osmosis Membrane]

The wet-oxidized liquid obtained in Example 2 was (pH6,COD(Cr)3.0 g/liter) treated with the reverse osmosis membrane by repeating the steps of Example 2, except that as the reverse osmosis membrane, polyvinyl alcohol type membrane (having salt rejection (i.e. rejection rate) of 93 percent with respect to 0.15 percent aqueous solution of sodium chloride) was used, and the treatment was conducted under the pressure of 1.96 MPa(Gauge).

The polyvinyl alcohol type membrane as the reverse osmosis membrane had no ability of separating organic substances, and the permeated liquid had COD(Cr) of 2.6 g/liter whereas the wet-oxidized liquid had COD (Cr) of 3.0 g/liter.

Example 3

Waste water was treated under the following conditions for 500 hours using the same apparatus as that used in Example 1.

[Wet-oxidation]

Into the reaction tower 1, 0.8 liters of a catalyst containing titania and platinum as main components was charged, and the content of the platinum was 0.5 weight percent. The waste water treated in Example 3 was from an electric power plant, and contained ammonium sulfate, sodium ion, and carbonate ion. The waste water had an ammonium concentration of 2.2 g/liter, and pH of 7.8. The amount of the solid content after evaporating the waste water was 15 g/liter.

The waste water was mixed with the liquid which did not permeate through the reverse osmosis membrane described later in the waste water tank 18. The resultant waste water was pressurized by the waste water supply pump 5 to flow at a flow rate of 0.8 liter/h, and was heated to 160° C. by a heater 3. Then, the waste water was supplied to the reaction tower 1 from its bottom side. On the other hand, the air was introduced through an oxygen containing gas supply line 10, and was pressurized by a compressor 9. Then, the flow rate of the air was controlled so that the relationship of $O_2$/COD (Cr) (i.e. the amount of oxygen in the supplied air/the amount of oxygen which the waste water chemically requires)=2.0 was satisfied, and was mixed with the waste water at the position before the heater 3. In the reaction tower 1, the waste water was oxidized and decomposed in the state where it was kept at a temperature of 160° C. by the electric heater 2. The wet-oxidized liquid was cooled to 30° C. by the cooler 4, and was supplied to the gas-liquid separator 13 where it was separated into the gas and the liquid. In the gas-liquid separator 13, as in the case of Example 1, the pressure inside the reaction tower 1 was detected by the pressure controller (PC), and was kept at 0.9 MPa(Gauge).

The resultant wet-oxidized liquid had an ammonia concentration of 0.53 g/liter, and pH of 7.1

[Treatment with Reverse Osmosis Membrane]

The wet-oxidized liquid was supplied to a reverse osmosis membrane treatment apparatus 20 under the pressure kept at 4.9 MPa(Gauge). In the apparatus 20, the wet-oxidized liquid was treated so that the volume of the impermeated liquid became about one-third (⅓) of the wet-oxidized liquid. As the reverse osmosis membrane, a polyamide type composite membrane satisfying the requirements of the present invention (having salt rejection (i.e. rejection rate) of 99.5 percent with respect to 0.15 percent aqueous solution of sodium chloride) was used.

The permeated liquid had an ammonia concentration of less than 0.01 g/liter, and the impermeated liquid had an ammonia concentration of 1.6 g/liter. Eighty percent of the impermeated liquid was supplied to the waste water tank 18 through the concentrated liquid return line 19 to be mixed with the waste water.

Example 4

Figure 3:
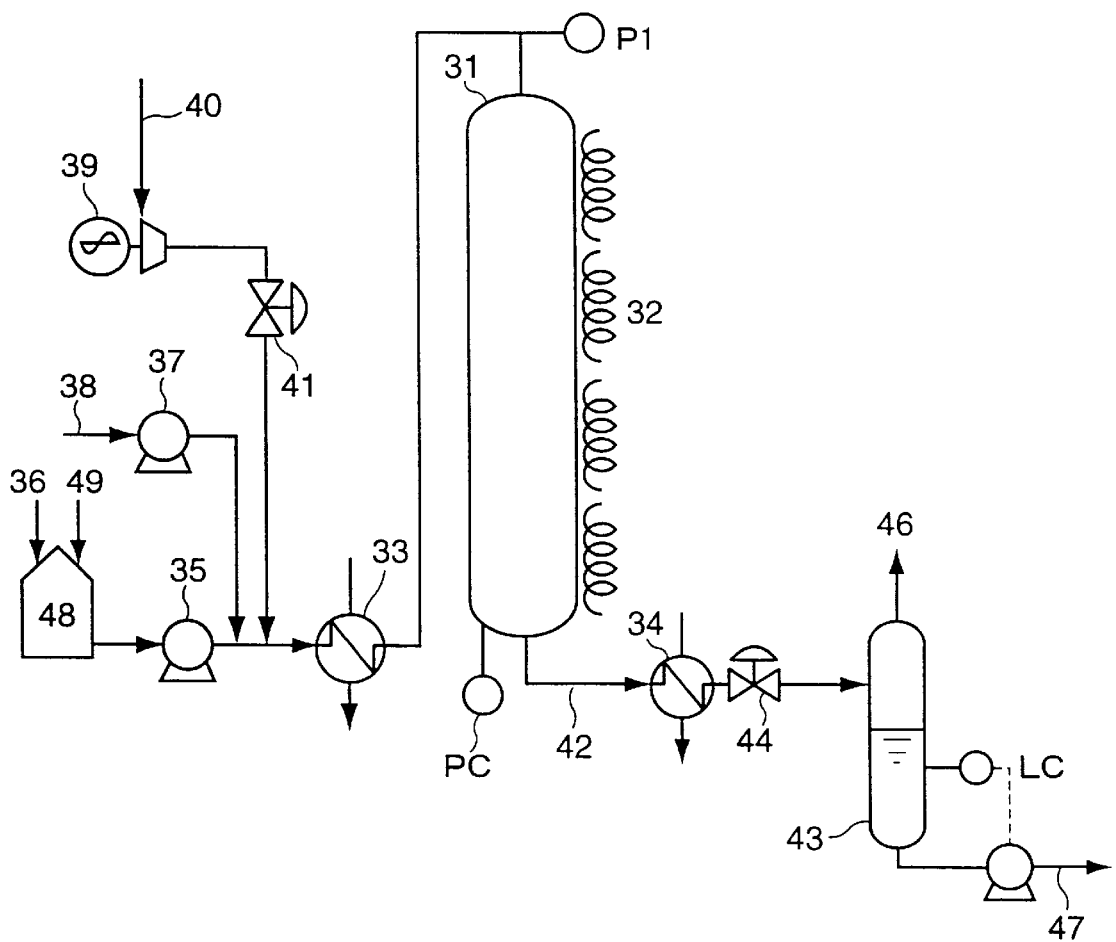
FIG. 3 is a schematic diagram of another wet-oxidation to be used in the embodiment of the present invention.
Figure 4:
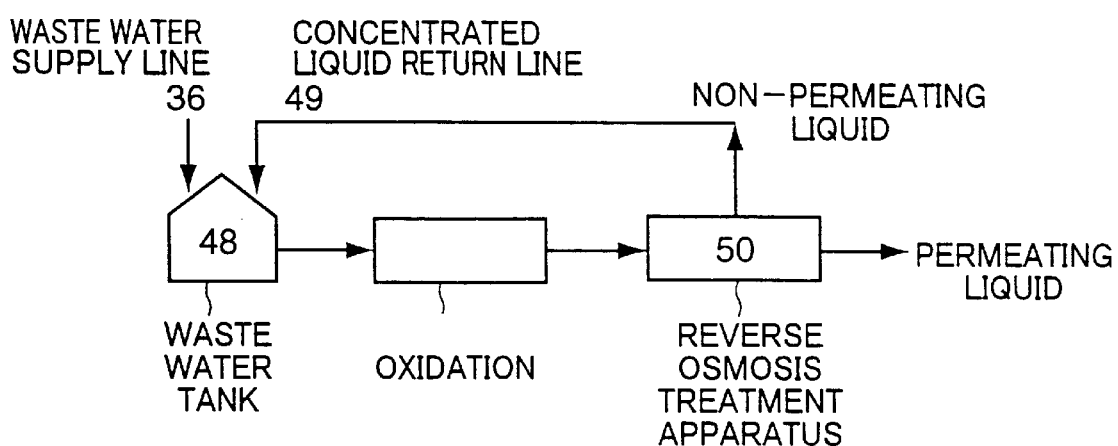
FIG. 4 is a conceptual diagram of the method for treating waste water in the embodiment of the present invention.

Waste water was treated under the following conditions for 500 hours using the apparatus shown in FIG. 3 and in FIG. 4.

[Wet-oxidation]

A reaction tower 31 had a shape of cylinder with a diameter of 26 mm and a length of 3000 mm. Into the reaction tower 31, 1.3 liters of a catalyst containing active carbon and platinum as main components was charged, and the content of the platinum was 0.2 weight percent. The waste water treated in Example 4 was solvent type waste water containing a large amount of alcohol such as ethyl alcohol and propyl alcohol. The waste water had COD (Cr) of 30 g/liter, and pH of 7.1. The waste water contained neither alkali metal ion, ammonium ion, nor inorganic salt.

The waste water supplied through a waste water supply line 36 was mixed with a liquid which did not permeate through the reverse osmosis membrane described later in a waste water tank 48. The resultant waste water was pressurized by a waste water supply pump 35 to flow at a flow rate of 1.3 liter/h, and was heated to 120° C. by a heater 33. Then, the waste water was supplied to the reaction tower 31 from its top side. On the other hand, a sodium hydrate aqueous solution was supplied to the waste water through an alkali supply line 38 by an alkali supply pump 37. The supply amount of the sodium hydrate aqueous solution was controlled so that the pH of the wet-oxidized liquid became about 6.5.

The air was supplied through an oxygen-containing gas supply line 40, and was pressurized by a compressor 39. Then, the flow rate of the air was controlled by an oxygen-containing gas flow rate control valve 41 so that the relationship of $O_2$/COD (Cr) (i.e. the amount of oxygen in the supplied air/the amount of oxygen which the waste water chemically requires)=0.7 was satisfied, and was mixed with the waste water at the position before the heater 33. In the reaction tower 31, the waste water and the air were made to flow in a downward direction in parallel with each other. In the reaction tower 31, the waste water was subjected to oxidation in the state where it was kept at a temperature of 120° C. by an electric heater 32. After the wet-oxidation, the wet-oxidized liquid was supplied through a wet-oxidized liquid line 42 to a cooler 34 where it was cooled to a temperature of 80° C. And then, the wet-oxidized liquid was discharged through a pressure control valve 44 to a gas-liquid separator 43. The pressure inside the reaction tower 31 was detected by a pressure controller (PC), and was kept at 0.9 MPa(Gauge) by a pressure control valve 44.

The wet-oxidized liquid obtained in the above wet-oxidation had COD (Cr) of 9.1 g/liter. Among the total TOC components, 95 percent was acetic acid.

[Treatment with Reverse Osmosis Membrane]

The wet-oxidized liquid was supplied to the reverse osmosis treatment apparatus 50 under pressure kept at 2.9 MPa(Gauge). The wet-oxidized liquid was treated so that the volume of impermeated liquid became about one third (⅓) of the wet-oxidized liquid. As the reverse osmosis membrane, a polyamide type composite membrane satisfying the requirements of the present invention (having salt rejection (i.e. rejection rate) of 99.7 percent with respect to 0.15 percent aqueous solution of sodium chloride) was used.

The permeated liquid had COD (Cr) of less than 0.1 g/liters, and the impermeated liquid had COD (Cr) of 28 g/liter. All the amount of impermeated liquid was supplied to the waste water tank 48 through a concentrated liquid return line (not shown) to be mixed with the waste water.

Example 5

Waste water was treated by repeating the steps of Example 1, except for the following conditions.

[Wet-oxidation]

Into the reaction tower 1, no catalyst was charged. The waste water treated in Example 5 was sludge water for sewage treatment containing various organic substances. The waste water had COD (Cr) of 9.7 g/liter, and pH of 2.8.

The waste water was mixed with the liquid which did not permeate through the reverse osmosis membrane described later in the waste water tank 18. The resultant waste water was pressurized by a waste water pump 5 to flow at a flow rate of 1.6 liter/h, and was heated to 230° C. by a heater 3. Then, the waste water was supplied to the reaction tower 1 from its bottom side. A sodium hydrate aqueous solution was supplied to the waste water through an alkali supply line 8 so that the pH of the wet-oxidized liquid became about 6.5.

The flow rate of the air was controlled so that the relationship of $O_2$/COD (Cr) (i.e. the amount of oxygen in the supplied air/the amount of oxygen which the waste water chemically requires)=1.5 was satisfied.

In the reaction tower 1, the waste water was subjected to oxidation in the state where it was kept at 230° C. by an electric heater 2. The wet-oxidized liquid was cooled to 30° C. by a cooler 4, and was supplied to a gas-liquid separator 13 where it was separated into the liquid and the gas. In the gas-liquid separator 13, the wet-oxidized liquid was kept at a pressure of 4.9 MPa(Gauge).

The wet-oxidized liquid obtained in the above wet-oxidation had COD (Cr) of 3.3 g/liter. Among the total TOC components, 89 percent was acetic acid. The ammonia concentration thereof was 0.14 g/liter.

[Treatment with Reverse Osmosis Membrane]

The obtained wet-oxidized liquid was filtered with a filter having a filtering accuracy of 1 μm, and then was supplied to the reverse osmosis membrane treatment apparatus 20 under a pressure kept at 2.9 MPa(Gauge). The wet-oxidized liquid was treated so that the volume of the impermeated liquid became about one-third (⅓) of the wet-oxidized liquid. As the reverse osmosis membrane, a polyamide type composite membrane satisfying the requirements of the present invention (having salt rejection (i.e. rejection rate) of 99.5 percent) was used.

The permeated liquid had COD (Cr) of less than 0.1 g/liter, and an ammonia concentration of less than 0.01 g/liter. The impermeated liquid had COD (Cr) of 9.8 g/liter, and an ammonia concentration of 0.39 g/liter. Seventy percent of the impermeated liquid was supplied to the waste water tank 18 through a concentrated liquid return line 19 to be mixed with the waste water.

Example 6

Waste water was treated by repeating the steps of Example 4, except for the following conditions.

[Wet-oxidation]

Into the reaction tower 31, 1.3 liters of catalyst containing active carbon, ruthenium and palladium as main components was charged, and the content of the ruthenium was 0.4 weight percent and the palladium was 0.1 weight percent.

The waste water treated in Example 6 contained long-chain alcohol and solvent. It had COD (Cr) of 76 g/liter, and pH of 8.5.

The waste water was mixed with all the amount of the liquid which did not permeate through the reverse osmosis membrane and a part of the wet-oxidized liquid described later in the waste water tank 48 in such a manner that the COD (Cr) of the waste water became 35 g/liter. The resultant waste water was supplied to the reaction tower 31 from its top side at a flow rate of 0.65 liter/h and was kept to 0.9 MPa(Gauge). The mixture of the waste water and the air was heated to 140° C. by the heater 33, and was kept at 140° C. in the reaction tower 31 by the electric heater 32. The flow rate of the air was controlled so that the relationship of $O_2$/COD(Cr)=0.82 was satisfied.

The wet-oxidized liquid had COD(Cr) of 6.5 g/liter, and pH of 2.8. Among the total TOC components, 80 percent or more was organic acids such as succinic acid, acetic acid, and propionic acid. Fifty percent of the organic acids was acetic acid.

[Treatment with Reverse Osmosis Membrane]

Twenty-five percent of the wet-oxidized liquid was returned to the waste water tank 48 through a concentrated liquid return line (not shown). The remaining was supplied to a reverse osmosis membrane treatment apparatus 50 at a pressure kept at 1.5 MPa(Gauge), and was treated so that the volume of the impermeated liquid became about a half (½) of the wet-oxidized liquid. Before this treatment, the wet-oxidized liquid was subjected to air bubbling to release the carbon dioxide therefrom, and an ammonia aqueous solution was added thereto so that the pH of the wet-oxidized liquid became about 6.

As the reverse osmosis membrane, a polyamide type composite membrane satisfying the requirements of the present invention (having salt rejection (i.e. rejection rate) of 99.5 percent) was used.

The permeated liquid had COD(Cr) of less than 0.1 g/liter, and an ammonia concentration of less than 0.1 g/liter. The impermeated liquid had COD(Cr) of 13 g/liter. All the amount of impermeated liquid was returned to the waste water tank 48 through a concentrated liquid return line 49 to be mixed with the waste water.

Example 7

[Wet-oxidation]

The same waste water as that treated in Example 1 was subjected to wet-oxidation by repeating the steps of Example 1, except that the impermeated liquid was not returned to the waste water tank 18.

The wet-oxidized liquid had COD(Cr) of 2.9 g/liter, and pH of 3.0. Among the total TOC components, 90 percent was acetic acid.

[Treatment with Reverse Osmosis Membrane($1^{st}$ time)]

The wet-oxidized liquid was mixed with a impermeated liquid which was obtained in the treatment with the reverse osmosis membrane at the second time described later, and as in the case of Example 1, the resultant wet-oxidized liquid was supplied to the reverse osmosis membrane treatment apparatus under a pressure kept at 4.9 MPa(Gauge). The wet-oxidized liquid was treated so that the volume of the impermeated liquid became about one-fifth (⅕) of the wet-oxidized liquid. The permeated liquid obtained in the treatment with the reverse osmosis membrane at the first time had COD(Cr) of 1.2 g/liter, and the impermeated liquid had COD(Cr) of 9.6 g/liter.

[Treatment with Reverse Osmosis Membrane(2nd time)]

The resultant permeated liquid was treated with the reverse osmosis membrane again in the same apparatus as that used in the first treatment. The second treatment was conducted in such a manner that the volume of the impermeated liquid became about one-third (⅓) of the permeated liquid obtained in the first treatment. The impermeated liquid obtained in the second treatment was mixed with the wet-oxidized liquid. The permeated liquid obtained in the treatment with the reverse osmosis membrane at the second time had COD(Cr) of 0.5 g/liter, and the impermeated liquid had COD(Cr) of 2.9 g/liter.

[Collection of Acetic Acid]

From the impermeated liquid obtained in the first treatment, acetic acid was collected by a solvent extraction and distillation. In the solvent extraction, the extraction was repeated three times with a separatory funnel using ethyl acetate as a solvent. The solvent phases obtained in the three extractions were mixed with each other, and the mixture was distilled in a distillation apparatus to collect acetic acid therefrom. 85 percent of the acetic acid contained in the wet-oxidized liquid was collected.

Comparative Example 3

[Collection of Acetic Acid]

The wet-oxidized liquid obtained in Example 7 was subjected to the acetic acid collection without being treated with the reverse osmosis membrane. 78 percent of the acetic acid contained in the wet-oxidized liquid was collected.

Example 8

[Wet-oxidation]

The same waste water as that treated in Example 7 was subjected to wet-oxidation repeating the steps of Example 7, except that a sodium hydrate aqueous solution was supplied to the waste water through an alkali supply line 8 in the process of wet-oxidation. The supply amount of the sodium hydrate aqueous solution was controlled so that the pH of the wet-oxidized liquid became about 6.

The wet-oxidized liquid had COD(Cr) of 3.3 g/liter. Among the total TOC components, 92 percent was acetic acid. The sodium ion was in an amount about 1.5 mol times larger than the acetic acid.

[Treatment with Reverse Osmosis Membrane]

The wet-oxidized liquid was supplied to the same reverse osmosis membrane treatment apparatus as that used in Example 1 under the pressure kept at 4.9 MPa(Gauge), and was treated so that the amount of the impermeated liquid became about one-fifth (⅕) of the wet-oxidized liquid. As a result of using the same reverse osmosis membrane as that used in Example 1, the permeated liquid had COD(Cr) of less than 0.1 g/liter, and the impermeated liquid had COD(Cr) of 16.5 g/liter.

[Collection of Acetic Acid]

The impermeated liquid was subjected to the same solvent extraction and distillation as those conducted in Example 7 to collect acetic acid therefrom. 97 percent of the acetic acid in the wet-oxidized liquid was collected.

Comparative Example 4

[Collection of Acetic Acid]

The wet-oxidized liquid obtained in Example 8 was subjected to the acetic acid collection without being treated with the reverse osmosis membrane, and the acetic acid was directly extracted by solvent extraction. 81 percent of the acetic acid in the wet-oxidized liquid was collected.

Example 9

[Wet-oxidation]

The same waste water used in Example 3 was subjected to wet-oxidation using the same apparatus and conditions of Example 3, except that the impermeated liquid was not supplied to the waste water tank. The wet-oxidized liquid had an ammonia concentration of 0.59 g/liter and pH of 7.2.

[Treatment with Reverse Osmosis Membrane]

The wet-oxidized liquid was treated using the same reverse osmosis membrane as that used in Example 3. The obtained permeated liquid had an ammonia concentration of less than 0.01 g/liter, and the impermeated liquid had an ammonia concentration of 1.8 g/liter. The impermeated liquid was supplied to a distillation apparatus, and was subjected to distillation. As a result, ammonia water of about 5 weight percent (i.e. 95 percent of ammonia in the wet-oxidized liquid) was collected therefrom.

Comparative Example 5

[Collection of Ammonia]

The wet-oxidized liquid obtained in Example 9 was subjected to distillation to collect ammonia. The collected ammonia was 83 percent of the ammonia in the wet-oxidized liquid.

Example 10

The waste water used in Example 10 was from a plant producing aliphatic carboxylic acid and aliphatic carboxylic acid ester, and contained organic compounds having two or more carbon atoms such as carboxylic acid. The waste water had COD (Cr) of 6.5 g/liter, and pH of 3.1. Among the total TOC components, about 94 percent was acetic acid. A sodium hydrate aqueous solution was supplied to the waste water so that the pH of the waste water became about 6.2.

[Treatment with Reverse Osmosis Membrane]

The pH adjusted waste water was supplied to the reverse osmosis treatment apparatus (i.e. shown in FIG. 2) under the pressure kept at 3 MPa(Gauge). In the apparatus, the waste water was treated so that the volume of the impermeated liquid became about one-third (⅓) of the waste water. As the reverse osmosis membrane, a polyamide type composite membrane satisfying the requirements of the present invention (having salt rejection (i.e. rejection rate) of 99.5 percent with respect to 0.15 percent aqueous solution of sodium chloride) was used. The permeated liquid had COD(Cr) of 0.05 g/liter and the impermeated liquid had COD(Cr) of 19.4 g/liter.

Comparative Example 6

[Treatment with Reverse Osmosis Membrane]

The waste water used in Example 10 was treated with the reverse osmosis membrane by repeating the steps of Example 10, without adjusting the pH of the waste water. The permeated liquid had COD(Cr) of 2.7 g/liter and the impermeated liquid had COD(Cr) of 14.2 g/liter.

Comparative Example 7

[Treatment with Reverse Osmosis Membrane]

The waste water used in Example 10 was treated with the reverse osmosis membrane by repeating the steps of Example 10, except that as the reverse osmosis membrane, the cellulose acetate type membrane (having salt rejection (i.e. rejection rate) of 95 percent with respect to 0.15 percent aqueous solution of sodium chloride) was used.

The permeated liquid had COD(Cr) of 4.7 g/liter and the impermeated liquid had COD(Cr) of 10.1 g/liter.

Example 11

The waste water used in Example 11 was from a plant producing semi-conductor and, contained ammonium sulfate, sodium ion and carbonic ion. The waste water had an ammonia concentration of 1.5 g/liter and pH of 7.2.

[Treatment with Reverse Osmosis Membrane]

The waste water was supplied to the reverse osmosis treatment apparatus under the pressure kept at 2 MPa (Gauge). In the apparatus, the waste water was treated so that the volume of the impermeated liquid became about one-fourth (¼) of the waste water. As the reverse osmosis membrane, a polyamide type composite membrane satisfying the requirements of the present invention (having salt rejection (i.e. rejection rate) of 99.5 percent with respect to 0.15 percent aqueous solution of sodium chloride) was used.

The permeated liquid had an ammonia concentration of less than 0.1 g/liter and the impermeated liquid had an ammonia concentration of 5.9 g/liter.

Comparative Example 8
[Treatment with Reverse Osmosis Membrane]

The waste water used in Example 11 was treated with the reverse osmosis membrane by repeating the steps of Example 11, except that as the reverse osmosis membrane, the cellulose acetate type membrane (having salt rejection (i.e. rejection rate) of 95 percent with respect to 0.15 percent aqueous solution of sodium chloride) was used.

The permeated liquid had an ammonia concentration of 3.0 g/liter and the impermeated liquid had ammonia of 6.2 g/liter.

Example 12

The impermeated liquid(COD(Cr) 19.4 g/liter) obtained by Example 10 was used as the waste water. The oxidation of the waste water was conducted using the wet-oxidation apparatus shown in FIG. 3 for 100 hours under the following condition.
[Wet-oxidation]

A reaction tower 31 used for the wet-oxidation had the shape of cylinder with a diameter of 26 mm and a length of 3000 mm. The reaction tower 31 was filled with 1.0 liters of a catalyst containing active carbon and platinum as main components, and the content of the platinum was 0.1 weight percent.

The waste water was supplied to a waste water supply pump 35 and was pressurized to flow at a flow rate of 0.5 liter/h, and was heated to 120° C. by a heater 33. Then, the waste water was supplied to the reaction tower 31 from its upper side. In the reaction 31, the waste water and the air were made to flow in an upward direction in parallel with each other.

On the other hand, the air was introduced through a oxygen-containing gas supply line 40, and was pressurized by a compressor 39. Then, the flow rate of the air was controlled by an oxygen-containing gas flow rate control valve 41 so that the relationship of $O_2$/COD (Cr) (i.e. the amount of oxygen in the supplied air/the amount of oxygen which the waste water chemically requires)=0.99 was satisfied. After that, the air was mixed with the waste water at the position before a heater 33.

In the reaction tower 31, the temperature of the waste water was kept at about 120° C. by an electric heater 32, and the oxidation thereof was conducted. After the wet-oxidation, the wet-oxidized water was supplied through a wet-oxidized liquid line 42 to a cooler 34, where the wet-oxidized water was cooled, and was supplied to a gas-liquid separator 43 where the separation of the liquid and the gas was conducted. The pressure was detected by a pressure controller (PC), and was kept to 0.6 MPa(Gauge) by a pressure control valve 44.

The wet-oxidized liquid obtained in the above wet-oxidation had COD (Cr) of 0.14 g/liter, and pH of 7.8. Among the total TOC components, 99 percent was acetic acid.

Example 13
[Treatment with Reverse Osmosis Membrane]

The wet-oxidized liquid obtained by Example 12 was supplied to the reverse osmosis treatment apparatus 50 (FIG. 4) under the pressure kept at 1 MPa(Gauge). In the apparatus, the waste water was treated so that the volume of the impermeated liquid became about one-fifth (⅕) of the waste water. As the reverse osmosis membrane, a polyamide type composite membrane satisfying the requirements of the present invention (having salt rejection (i.e. rejection rate) of 99.5 percent with respect to 0.15 percent aqueous solution of sodium chloride) was used. The permeated liquid had COD (Cr) of 0.01 g/liter and the impermeated liquid had COD(Cr) of 0.7 g/liter.

Example 14

The oxidation was conducted using the wet-oxidation apparatus (FIG. 1) for 100 hours under the following condition.
[Wet-oxidation]

The impermeated liquid(ammonia concentration 5.9 g/liter) obtained by Example 11 was used as the waste water. A reaction tower 1 used for the wet-oxidation had the shape of cylinder with a diameter of 26 mm and a length of 3000 mm. The reaction tower 1 was filled with 1.0 liters of a catalyst containing titanium and platinum as main components, and the content of the platinum was 0.3 weight percent.

The waste water was supplied to a waste water supply pump 5 and was pressurized to flow at a flow rate of 0.5 liter/h, and was heated to 160° C. by a heater 3. Then, the waste water was supplied to the reaction tower 1 from its bottom side. On the other hand, the air was introduced through a oxygen-containing gas supply line 10, and was pressurized by a compressor 9. Then, the flow rate of the air was controlled by an oxygen-containing gas flow rate control valve 11 so that the relationship of $O_2$/COD (Cr)=2.0 was satisfied. After that, the air was mixed with the waste water at the position before a heater 3.

In the reaction tower 1, the temperature of the waste water was kept at about 160° C. by an electric heater 2, and the oxidation thereof was conducted. After the wet-oxidation, the wet-oxidized water was cooled to 30° C. by the cooler 4, and was supplied to gas-liquid separator 13 where the separation of the liquid and the gas was conducted. In the gas-liquid separator 13, the liquid level was detected by a liquid level controller 15, and the wet-oxidized liquid was discharged from a liquid level control valve 15 in the state where its liquid level was kept to be constant. The pressure inside the reaction tower was detected by a pressure controller (PC), and was kept to 0.9 MPa(Gauge) by a pressure control valve 14.

The ammonia concentration of the thus obtained liquid was 0.3 g/liter.

What is claimed is:

1. A method for treating a waste water, comprising the steps of:
   wet-oxidizing a waste water containing an organic compound having two or more carbon atoms and/or a nitrogen compound; and
   separating the wet-oxidized waste water into a permeated liquid and an impermeated liquid with a reverse osmosis membrane having a high salt rejection rate, the permeated liquid having permeated through the reverse osmosis membrane, and the impermeated liquid having not permeated through the reverse osmosis membrane,
   wherein said wet-oxidizing is conducted in a reaction tower at a temperature ranging from 80° C. to 370° C. and wherein said reverse osmosis membrane is a polyamide type composite membrane.

2. The method according to claim 1, wherein the impermeated liquid contains an organic acid.

3. The method according to claim 1, further comprising the step of re-flowing all or a part of the impermeated liquid into the waste water to be oxidized.

4. The method according to claim 1, further comprising the step of collecting organic acid and/or ammonia from all or a part of the impermeated liquid.

5. The method according to claim 4, wherein the collection of organic acid and/or ammonia is conducted by extraction and/or distillation.

6. The method according to claim 1, further comprising the step of adding alkali metal and/or ammonium ion to the waste water at any point of oxidation.

7. The method according to claim 1, further comprising the step of adding organic acid and/or inorganic acid to the waste water at any point of oxidation.

8. The method according to claim 1, wherein the wet-oxidized liquid has pH of 4 or higher.

9. The method according to claim 1, further comprising the step of re-flowing a part of the wet-oxidized waste water and/or all or a part of the permeated liquid into the waste water to be wet-oxidized.

10. The method according to claim 1, wherein the wet-oxidation is conducted in the presence of a solid catalyst.

11. The method according to claim 1, wherein the waste water is a liquid discharged from a plant producing aliphatic carboxylic acid, aromatic carboxylic acid, or esters thereof.

12. The method according to claim 1, wherein the wet-oxidized waste water contains at least 30 weight percent of an oxidizable substance which has not been wet-oxidized.

13. The method according to claim 12, wherein the oxidizable substance is acetic acid and/or ammonia.

14. The method according to claim 1, wherein the impermeated liquid contains an acetic acid and/or an ammonia.

15. A method for treating a waste water, comprising steps of:

separating a waste water containing an organic compound having two or more carbon atoms and/or a nitrogen compound into a permeated liquid and an impermeated liquid with a reverse osmosis membrane having high salt rejection rate;

oxidizing all or a part of the impermeated liquid; and collecting organic acid and/or ammonia from all or a part of the oxidized impermeated liquid obtained by said oxidizing.

16. The method according to claim 15, wherein the waste water contains acetic acid and/or ammonia.

17. The method according to claim 15, wherein the impermeated liquid is oxidized by wet-oxidation.

18. A method for treating a waste water, comprising the steps. of:

separating a waste water containing an organic compound having two or more carbon atoms and/or a nitrogen compound into a permeated liquid and an impermeated liquid with a reverse osmosis membrane having high salt rejection rate;

collecting an organic compound and/or a nitrogen compound from all or a part of the impermeated liquid.

19. The method according to claim 18, wherein the reverse osmosis membrane is a polyamide type composite membrane.

20. The method according to claim 18, wherein the waste water contains an acetic acid and/or an ammonia.

21. The method according to claim 18, wherein the waste water has pH of 4 or higher.

22. A method for treating a waste water, comprising the steps of:

wet-oxidizing a waste water containing an organic compound having two or more carbon atoms and/or a nitrogen compound;

separating the wet-oxidized waste water into a permeated liquid and an impermeated liquid with a reverse osmosis membrane having a high salt rejection rate, the permeated liquid having permeated through the reverse osmosis membrane, and the impermeated liquid having not permeated through the reverse osmosis membrane; and collecting organic acid and/or ammonia from all or a part of the impermeated liquid.

23. The method according to claim 22, wherein the waste water is a liquid discharged from a plant producing aliphatic carboxylic acid, aromatic carboxylic acid, or esters thereof.

24. The method according to claim 22, wherein the wet-oxidized waste water contains at least 30 weight percent of an oxidizable substance which has not been oxidized.

25. The method according to claim 24, wherein the oxidizable substance is acetic acid and/or ammonia.

26. The method according to claim 22, wherein the impermeated liquid contains an organic acid.

27. The method according to claim 22, wherein the impermeated liquid contains an acetic acid and/or an ammonia.

28. The method according to claim 22, further comprising the step of re-flowing a part of the oxidized waste water and/or all or a part of the permeated liquid into the waste water to be oxidized.

29. The method according to claim 22, wherein said reverse osmosis membrane is a polyamide type composite membrane.

30. The method according to claim 22, further comprising a step of re-flowing all or a part of the impermeated liquid into the waste water to be oxidized.

31. The method according to claim 22, wherein said collecting organic acid and/or ammonia is conducted by extraction and/or distillation.

32. The method according to claim 22, further comprising the step of adding alkali metal and/or ammonium ion to the waste water at any point of oxidation.

33. The method according to claim 22, further comprising the step of adding organic acid and/or inorganic acid to the waste water at any point of oxidation.

34. The method according to claim 22, wherein said wet-oxidized waste water has pH of 4 or higher.

35. The method according to claim 22, wherein said oxidizing is conducted in a reaction tower at a temperature ranging from 80 to 370° C.

36. The method according to claim 22, wherein said oxidizing is conducted in the presence of a solid catalyst.

* * * * *